United States Patent

[11] 3,549,951

| [72] | Inventor | Merle A. Plummer<br>North Hollywood, Calif. |
|---|---|---|
| [21] | Appl. No. | 811,521 |
| [22] | Filed | Mar. 28, 1969 |
| [45] | Patented | Dec. 22, 1970 |
| [73] | Assignee | Myers Electric Products, Inc.<br>Montebelle, Calif.<br>a corporation of California |

[54] METER-BOX WITH DISCHARGE SIDE MOUNTING ARRANGEMENT
4 Claims, 8 Drawing Figs.

[52] U.S. Cl. ........................................... 317/107,
 317/109, 317/111
[51] Int. Cl. ........................................... H02b 9/00
[50] Field of Search ........................................... 174/48;
 324/156; 317/104, 105, 107, 108, 109—111

[56] References Cited
UNITED STATES PATENTS
| 3,067,362 | 12/1962 | Patton | 317/104 |
| 3,334,276 | 8/1967 | Bateman | 317/108 |

*Primary Examiner*—Lewis H. Myers
*Assistant Examiner*—Gerald P. Tolin
*Attorney*—R. S. Berry ABSTRACT: This invention pertains to a meter-box carrying an electric meter presented to the outer side thereof and to which meter electrical current is is supplied through underground conductors leading from a source of electrical supply; the invention residing in the construction and arrangement of parts constituting the discharge side of the meter-box and leading between the electric meter on the box and the electrical wiring system of an adjacent building.

PATENTED DEC 22 1970

INVENTOR
Merle A. Plummer;
By R. S. Berry
Atty.

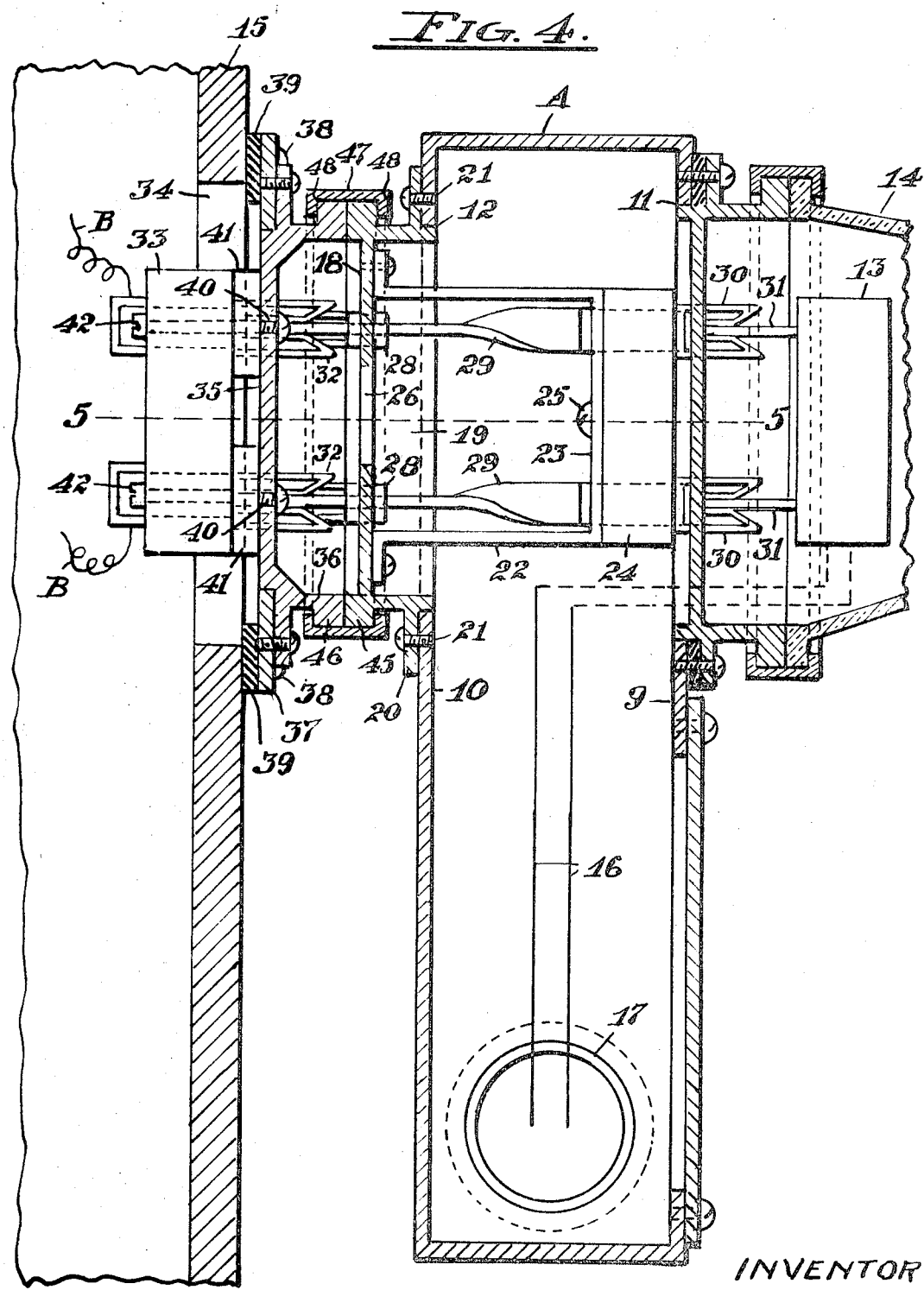

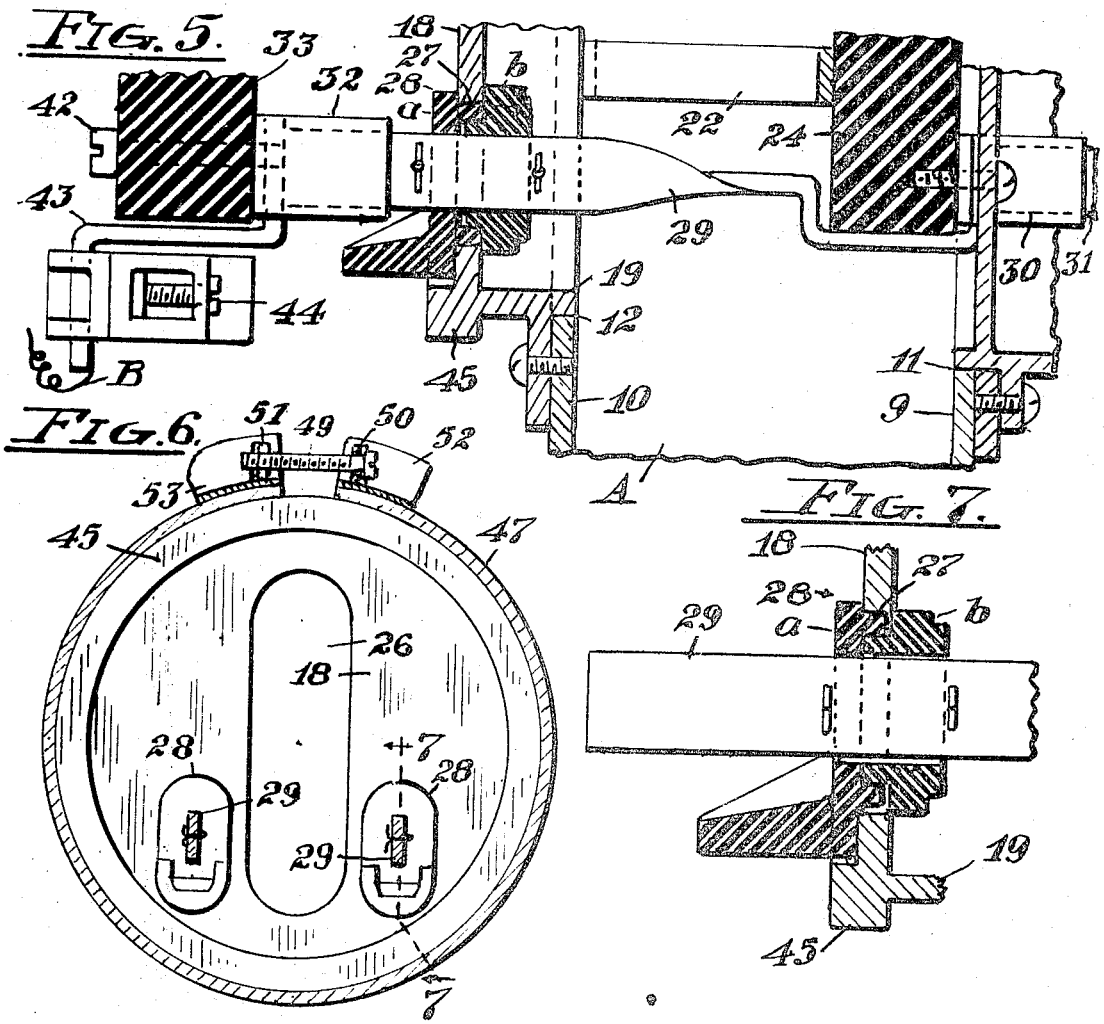
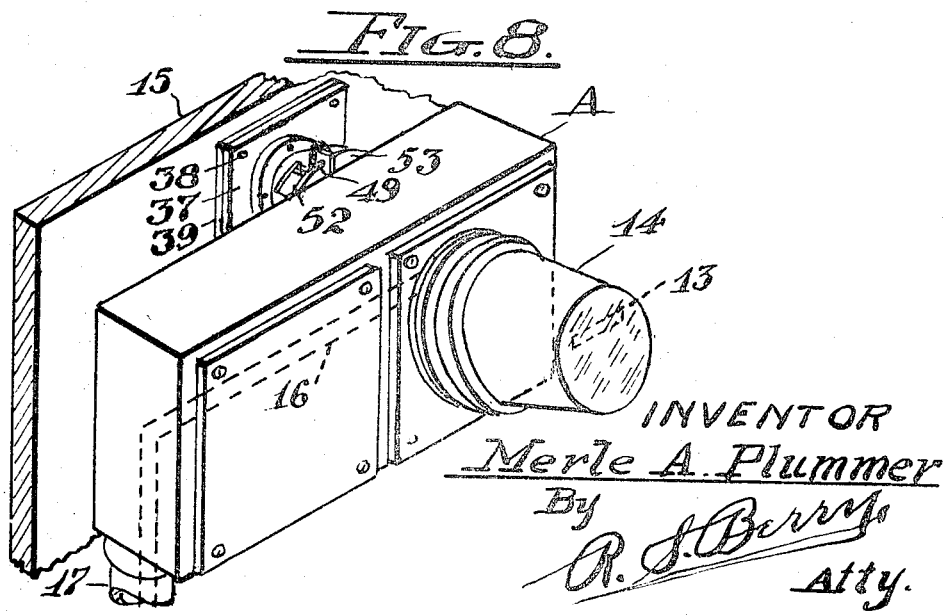

METER-BOX WITH DISCHARGE SIDE MOUNTING ARRANGEMENT

The invention resides in the interconnecting elements leading between the discharge side of the ordinary household electric meter and the ordinary electrical wiring system supplying electrical current to the various electrical utilities with which a home is equipped and is particularly applicable to electrical wiring systems where the electrical current is supplied underground from a source of supply.

A search of the United States patent records disclosed U.S. Pat. No. 3,067,362 issued Dec. 4, 1962 to C. C. Patton on Secondary Power Capacitors, which discloses features of construction similar to that of applicant; it embodies a housing having an electric meter on the front thereof connected to a source of electrical supply which is distributed through the back thereof, but not disclosing applicant's claimed construction.

An object of the invention is to provide a construction whereby existing overhead electric service to a building may be readily converted to underground service; it embodying a specially designed ring which is affixed to the meter-box and is fastened to the building wall by a detachable sealing ring whereby a weatherproof connection is provided between the meter-box and building.

The invention in illustrated in the accompanying drawings in which:

FIG. 4 is a view in horizontal section taken on the line 4–4 of FIG. 1, showing the manner of connecting the intake terminals of the meter with the underground source of electrical supply:

FIG. 5 is an enlarged elevational view taken substantially on the line 5–5 of FIG. 1 with parts removed:

FIG. 6 is a detail in section and elevation taken on a vertical line perpendicular to the plane of FIG. 4 showing the mode of connecting the discharge terminals of the meter with the service conductors:

FIG. 7 is a fragmentary sectional view and elevation on an enlarged scale as seen on the line 7–7 of FIG. 6: and FIG. 8 is an isometric view of the meter-box as applied.

Figure 1:
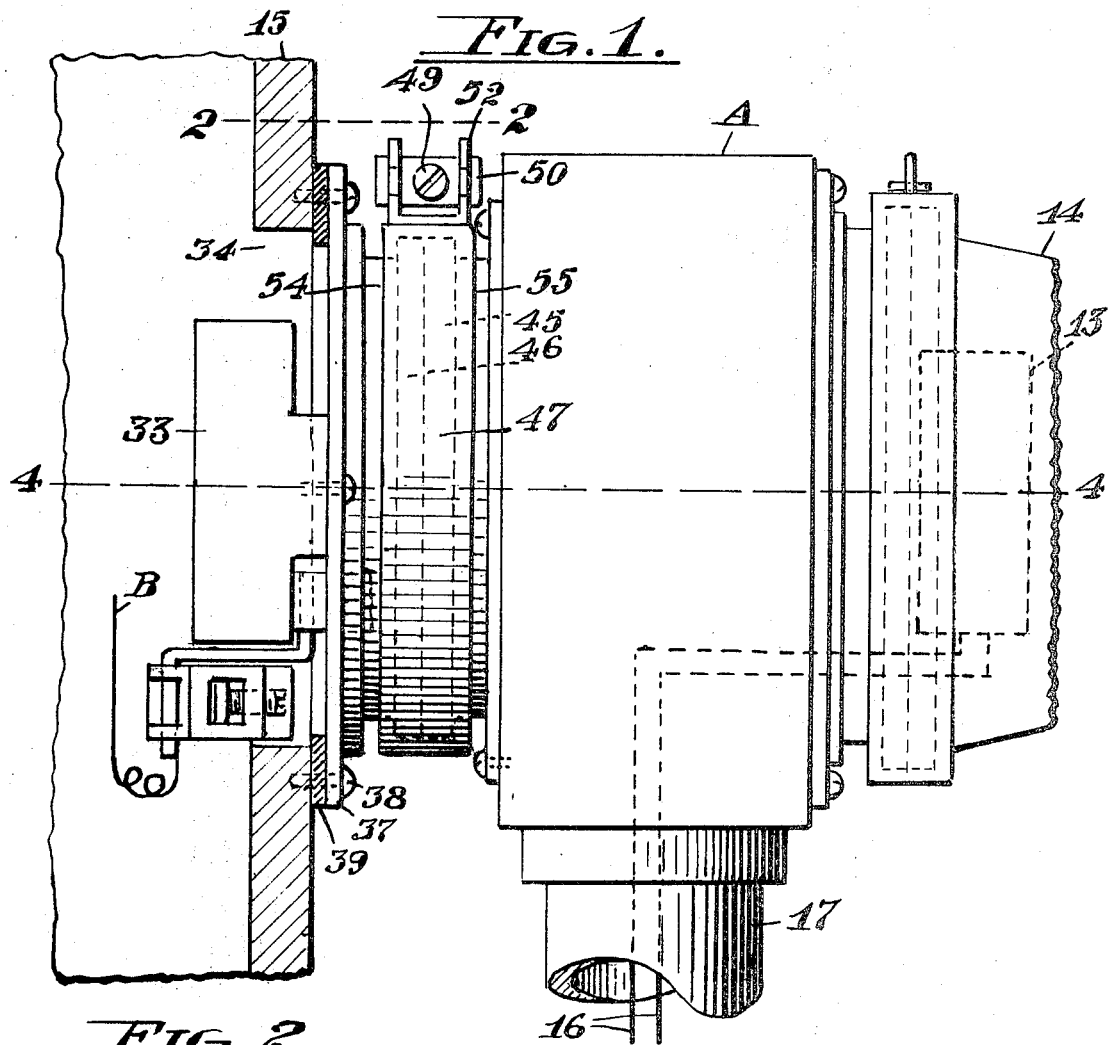
FIG. 1 is an end view of the meter-box as applied to the exterior of a building sidewall and connected to an underground source of electrical supply.

Referring to the drawings more specifically A indicates a meter-box provided with spaced-apart front and rear sidewalls 9—10 having opposed circular openings 11—12. A conventional electric meter 13, a portion only of which is here shown, is contained in a transparent housing 14 projecting from the opening 11 in the front wall 9 in the usual manner.

The meter-box A is designed to be mounted on the outer face of the sidewall 15 of a building with the meter in the housing 14 presented to view and connected to a pair of electrical conductors 16 leading through a conduit 17 attached to the underside of the box A and directed underground to a source of electrical supply.

The present invention has to do with the connection between the meter 13 and the electrical wiring B–B arranged within the wall 15 of a building and leading to electric utilities in the usual manner. Said connection embodies a cover disc 18 overlying the opening 12 exteriorly of the housing A; the disc 18 being mounted on an annulus 19 having an outwardly projecting flange 20 on its inner portion which seats on the outer face of the rear sidewall 10 of the housing A and is secured thereto by screws 21.

A U-bracket 22 has its ends affixed to and projecting from the inner side of the disc 18 with its connecting portion 23 attached to and supporting an insulated block 24 by a screw 25.

The disc 18 is provided with an elongated central opening 26 through which the screw 25 is put in place and removed when need be.

A pair of openings 27–27 are provided in the disc 18 which are fitted with insulators 28–28 comprising sections a—b disposed on opposite sides of the disc as particularly shown in FIG. 7; the pair of insulators overlapping each other in the openings and encompassing flat conductors 29–29 which lead from connectors 30–30 carried by the block 24 which connectors engage the discharge terminals 31 of the meter 13 in the housing 14.

The meter-box A is designed to be removably attached to the exterior of the house wall 15 with the discharge side of the electric meter 13 connected to the feed wires B–B of the building electrical system and with the intake side of the meter connected to the conductors 16 leading through the conduit 17 to the source of electrical supply.

In carrying out the invention, the outer ends of the pair of conductors 29–29 are telescoped into sliding engagement with a pair of conventional spring tongue contact members 32–32 mounted on an insulating block 33 arranged in an opening 34 in the building sidewall 15; the block being detachably mounted on a crossbar 35 carried on an annulus 36 attached to a plate 37 which latter is secured to the wall 15 by screws 38 with a waterproof gasket 39 interposed between the plate 37 and the margin of the opening 34.

A pair of screws 40 is employed in connecting the insulating block 33 to the crossbar 35, which screws 40 are passed through the bar from the outer side thereof and are detachably engaged with a pair of bosses 41 formed integral with the block 33 and projecting from the outer side of the latter.

The contact members 32–32 are affixed to the insulating block 33 by headed screws 42–42 which pass through the block 33 from the inner sides thereof and through end portions of the contact members 32–32 and are threaded into engagement with flat conductors 43 which lead downward and across the underside of the insulated block 33 with their terminals bent downward and engaged in screw clamps 44 together with the terminals of the wiring conductors B–B.

By this arrangement the conductors B–B of the house wiring system are interconnected with the discharge side of the meter 13 when the box A is mounted on the wall 15, which mounting is effected by initially positioning the marginal flange 45 on the end plate 18 in abutting relation to a marginal flange 46 on the annulus 36 affixed to wall 15 at the time the ends of the contact members 29–29 are telescoped into sliding engagement with the contact members 32–32 on the block 33.

Figure 2:
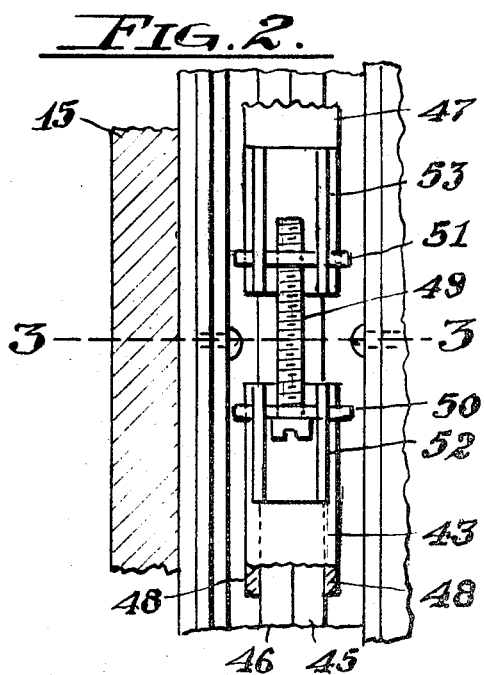
FIG. 2 is a fragmentary plan view taken on the line 2–2 of FIG. 1, depicting the mode of mounting the meter-box on the exterior of a building wall which feature constitutes the essence of the invention.
Figure 3:
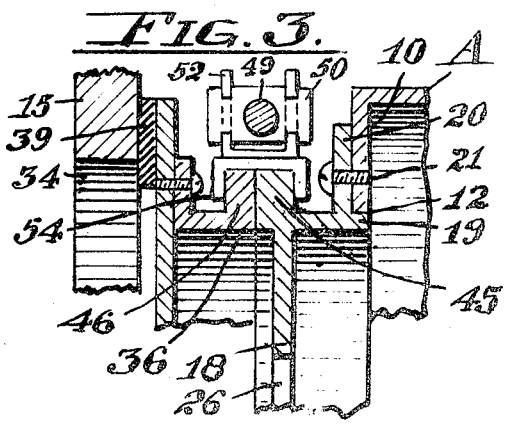
FIG. 3 is a fragmentary vertical section taken on the line 3–3 of FIG. 2, depicting the mode of mounting the meter-box in accordance with the invention.

To complete the interconnection between the flanges 45-—46 a split ring 47 having side flanges 48–48 is positioned astride the abutting flanges 45—46 and has its ends drawn toward each other to draw the ring into clamping engagement with the flanges 45—46. This is accomplished by means of a screw 49, particularly shown in FIGS. 2 and 3, which interengages a pair of parallel cross plates 50–51 having their ends engaged by upstanding spaced sidewalls of a pair of channel members 52—53 mounted on and extending longitudinally of the end portions of the ring 47. The ring 47 has inwardly projecting side flanges 54—55 which overlie the outer sides of the flanges 45—46 thereby securely yet detachably mounting the meter-box A on the building sidewall. By thus mounting the meter-box a waterproof connection is attained between the meter-box and wall.

The operation of the invention is apparent from the foregoing it being manifest that on mounting the meter-box as set forth and directing electric current through the meter from the source of supply such current will flow from the meter across the meter-box to the point of consumption.

I claim:
1. In a meter-box:
   a. rigidly spaced apart front and rear sidewalls having opposed openings;
   b. an annulus projecting from the outer face of said rear sidewall in encircling relation to the opening therein;

c. said annulus having a flange projecting outwardly from its inner margin and seated on the outer face of said rear said wall;

d. an outwardly projecting flange on the outer margin of said annulus;

e. an end wall on said rear sidewall extending over the opening in the rear sidewall;

f. a bracket carried on said end wall and projecting interiorally of the space intermediate the front and rear sidewalls;

g. an insulating block carried on said bracket projecting into said opening in said front sidewall;

h. an electric meter mounted on said insulating block and projecting from the opening in said front wall, having a pair of discharge terminals;

i. a pair of spaced-apart electrical conductors extending from the discharge terminals of said electric meter and projecting from said insulating block, through said end wall;

j. insulators interposed between said conductors and end wall;

k. means connecting said conductors to the electrical supply wires of a building; and l. means detachably connecting said annulus to the sidewall of a building.

2. The structure called for in claim 1 in which said last named means embodies a metallic ring, means for rigidly mounting said ring on the outer sidewall of a building, a flange on the outer margin of said ring against the outer face of which the flange of said annulus abuts, the flange on said ring and annulus being of corresponding outside diameters, a clamping ring encircling the abutting flanges, said clamping ring having inwardly projecting flanges on its side margins overlying the opposite side edges of said abutting flanges, said ring having overlapping free end portions and a screw interconnecting said end portions operable to contract said clamping ring into tight engagement with said abutting flanges.

3. A meter-box having front and rear walls provided with opposed openings with the opening in the front wall fitted with a meter housing containing an electric meter having discharge terminals extending into said meter-box;

a. an annulus surrounding the opening in said rear wall, projecting outwardly therefrom and affixed thereto;

b. a cover disc on said annulus;

c. a bracket projecting interiorally of said meter-box from said cover disc and affixed to the latter;

d. an insulating block attached to the inner end of said bracket;

e. a pair of electrical terminals carried by said block to which the discharge terminals of said meter are connected;

f. a pair of electrical conductors leading from the terminals on said block extending rearwardly through said rear wall;

g. insulators carried by said end wall through which said conductors extend; and h. means for connecting the outer ends of said conductors to the terminals of an electrical utilities system.

4. The structure called for in claim 3 together with means for mounting said meter-box including a ring, means for fastening said ring on a wall, and means for detachably interengaging said ring and said annulus.